Patented July 8, 1924.

1,500,915

UNITED STATES PATENT OFFICE.

ROBERT ARNOT, OF BUSHEY, ENGLAND.

DYES AND PROCESS OF MAKING SAME.

No Drawing.   Application filed August 31, 1921.   Serial No. 497,353.

*To all whom it may concern:*

Be it known that I, ROBERT ARNOT, a citizen of the Czechoslovak Republic, residing at Bushey, Herts, England, have invented certain new and useful Improvements in Dyes and Processes of Making Same, of which the following is a specification.

Experiments have shown that by distilling abietic acid or resins, which are its more or less impure state, with burnt lime or soda-lime there will be obtained phenol-like products which may constitute the starting materials for the making of dyestuffs.

The object of my invention resides in the feature of introducing chromophore or auxochrome groups, which I designate generically as "chromogenetic," or groups of both kinds, into the bodies obtained by distilling resins with burnt lime or soda-lime and either to employ the resulting bodies per se as dyestuffs or to couple them with such bodies as are already employed for the making of azo-dyes. By these means a considerable number of new dyestuffs yielding the most diverging variety of tints will be obtained.

*Example.*

50 parts by weight of finely powdered colophony are well mixed with equal parts of freshly burnt, finely ground lime, the mixture then heated in a retort yields from 150 to 300°, 25 parts of a clear nearly colourless oil, with greenish fluorescence. This is introduced, while being stirred, into a cooled mixture composed of 15 parts by weight of nitric acid (D. 1.45) and 25 parts by weight of concentrated sulphuric acid. A solid nitro-compound is separated, which is reduced and diazotized in the following manner:

10 parts by weight of the powdered nitro compound are dissolved in 30 parts by weight of a hot 10% solution of caustic soda, while a concentrated solution of sodium-hydrosulphite is added to the boiling solution. The mixture is strongly boiled in a vessel provided with a reflux cooler for the space of an hour, whereupon dilute hydrochloric acid is gradually added to the continuously boiling solution until the sulphurous acid has been completely expelled. It is advisable to add with the hydrochloric acid also some acetic acid to keep the amino-phenol resin in solution. Hereupon the solution is cooled with ice and diazotized. The diazo compound couples for instance with R salt (sodium salt of 2 naphtol, 3-6 disulphonic acid) wine red, with G salt (2 naphtol, 6-8 disulphonic acid) brownish red, with chromotrope acid (1, 8 oxy, 4-5 disulphonic acid) violet, with H acid (1 amino 8 oxy 3, 6 disulphonic acid) violet blue. To obtain a black dye the diazo compound is introduced, while being stirred, into the solution of a predetermined quantity of $\alpha$ naphthylamine in acetic acid. After being allowed to stand overnight, one separates out the black precipitate, which is repeatedly washed with hot dilute hydrochloric acid and thereupon dissolved in a hot 10% soda solution. The dark orange coloured solution thereby produced is again filtered for the purpose of removing any possible insoluble traces of $\alpha$ naphthylamine, whereupon the filtrate is acidified giving rise to a precipitate of a violet tint. The well cooled mixture is again diazotized, yielding a deep violet dyestuff with R salt, a brownish black dyestuff in combination with G salt and a bluish black dyestuff in combination with H acid.

The dyeing operations are performed by putting the wool into the dye bath at a temperature of 50° whereupon 2% of sulphuric acid is gradually added and the wool allowed to remain in the dye bath for the space of an hour at 90°. The vat will only be partially discolored.

From the residue in the retort (i. e., residue obtained by heating the rosin and lime) there may be isolated other phenol-like products either by extraction with alcohol or by boiling with acids. These products will easily dissolve in soda and may be coupled with diazo-compounds.

What I claim is:

1. The process which comprises distilling a resin with lime, nitrating the phenol-like body formed thereby and reducing the resulting nitro compound to an amino compound.

2. The process which comprises distilling a resin with lime, nitrating the phenol-like body formed thereby, reducing the resulting nitro compound to an amino compound and diazotizing the resulting amino compound.

3. The process which comprises distilling a resin with lime, nitrating the phenol-like body formed thereby, reducing the resulting nitro compound to an amino compound, diazotizing the resulting amino compound and coupling the resulting diazo compound with another compound to form an azo dye.

4. The process which comprises distilling a resin with lime, nitrating the phenol-like body formed thereby, reducing the nitro compound to an amino compound, and coupling the same with another compound to form an azo dye, one of said compounds being diazotized before the coupling operation.

5. The process which comprises distilling a resin with lime, nitrating the phenol-like body formed thereby and introducing thereinto a chromophorous group.

6. The process which comprises distilling a resin with lime, nitrating the phenol-like body formed thereby, and introducing thereinto chromophorous and auxochromous groups.

7. The process which comprises distilling a resin with lime, nitrating the phenol-like body formed thereby, and introducing thereinto a chromogenetic group.

8. The process which comprises distilling a resin with lime, nitrating the phenol-like body formed thereby and introducing thereinto chromogenetic groups.

9. An azo dye comprising a coupling product of the amino derivative of a phenol-like body formed by distilling resin with an alkali, and another amino aromatic body, one of said compounds being diazotized before the coupling operation.

10. An azo dye comprising a coupling product of an amino-aromatic body with the diazo amino derivative of the phenol-like product from the distillation of resin.

In testimony whereof I have hereunto set my hand in presence of two subscribing witnesses.

ROBERT ARNOT.

Witnesses:
  DAVID BLEEDLUP,
  DAISY JEWELL.